US008371024B2

(12) United States Patent
Hertle

(10) Patent No.: US 8,371,024 B2
(45) Date of Patent: Feb. 12, 2013

(54) APPARATUS AND PROCESS FOR FILLING STRUCTURES WITH DIFFERENT CAVITIES

(75) Inventor: Karl Hertle, Harburg (DE)

(73) Assignee: Grenzebach Maschinenbau GmbH, Asbach-Baumenheim (DE)

( * ) Notice: Subject to any disclaimer, the term of this patent is extended or adjusted under 35 U.S.C. 154(b) by 100 days.

(21) Appl. No.: 12/667,727

(22) PCT Filed: Jul. 7, 2008

(86) PCT No.: PCT/DE2008/001125

§ 371 (c)(1), (2), (4) Date: Jan. 5, 2010

(87) PCT Pub. No.: WO2009/006883

PCT Pub. Date: Jan. 15, 2009

(65) Prior Publication Data

US 2010/0187725 A1 Jul. 29, 2010

(30) Foreign Application Priority Data

Jul. 9, 2007 (DE) ........................ 10 2007 031 906

(51) Int. Cl.
*B23P 19/00* (2006.01)

(52) U.S. Cl. ................ 29/793; 29/711; 29/779; 29/650; 29/451; 83/27; 83/47; 52/404.1

(58) Field of Classification Search .................... 29/650, 29/707, 709, 710, 711, 714, 720, 771, 779, 29/786, 791, 793, 794, 819, 822, 823, 451; 83/27, 29, 37, 39, 44, 45, 47, 73, 79, 150, 83/151, 152, 155, 155.1; 52/404.1, 405.1
See application file for complete search history.

(56) References Cited

U.S. PATENT DOCUMENTS 3,343,251 A * 9/1967 Augsburger .................... 29/451
4,485,546 A * 12/1984 Forslund .......................... 29/451
5,208,954 A * 5/1993 Nickerson et al. ............ 29/33 K

FOREIGN PATENT DOCUMENTS

AT 367 680 7/1982
DE 2703027 7/1978
(Continued)

OTHER PUBLICATIONS

Japanese Patent Office, Office Action mailed Jan. 17, 2012, pp. 1-3.

*Primary Examiner* — David Bryant
*Assistant Examiner* — Christopher Koehler
(74) *Attorney, Agent, or Firm* — Duane Morris LLP; J. Rodman Steele, Jr.; Gregory M. Lefkowitz

(57) ABSTRACT

Process for industrially filling differently structured cavities in building blocks with moldings, having the following features: a) the moldings are cut in the form of differently configured mineral-wool pads (1, 2) from mineral-wool boards supplied, b) the mineral-wool pads (1, 2) are then distributed in layers on at least two levels, c) the mineral-wool pads (1, 2) distributed in this way are respectively separated, arranged in rows and moved into a vertical position in order to be transported further, d) the vertically positioned mineral-wool pads (1, 2) are pushed off laterally in layers and distributed on at least two levels in a supply unit (A 170), wherein, for example, one level has large mineral-wool pads (1) and the other level has small mineral-wool pads (2) and the levels are arranged in accordance with the construction of the cavities of the building block; e) in a further position of the distributing unit (A 180), the mineral-wool pads (1, 2) are pushed into sheet-metal channels, moved up to the building blocks and sucked in there (A 190).

16 Claims, 6 Drawing Sheets

FOREIGN PATENT DOCUMENTS

| | | |
|---|---|---|
| DE | 10058463 | 5/2002 |
| DE | 10217548 | 11/2003 |
| DE | 102006022516 | 2/2007 |
| DE | 102006002826 | 3/2007 |
| DE | 102006034073 | 4/2007 |
| DE | 102006002281 | 8/2007 |
| DE | 202007009591 | 9/2007 |
| EP | 0501382 | 9/1992 |
| EP | 1752593 | 12/2007 |
| JP | 50-123075 | 9/1975 |
| JP | 64-062221 | 3/1989 |
| JP | 08-085031 A | 4/1996 |
| JP | 2002-061058 | 2/2002 |
| JP | 2002-201729 | 7/2002 |
| WO | WO 99/45218 | 9/1999 |

* cited by examiner

APPARATUS AND PROCESS FOR FILLING STRUCTURES WITH DIFFERENT CAVITIES

CROSS-REFERENCE TO RELATED APPLICATIONS

This application is a §371 national stage entry of International Application No. PCT/DE2008/001125, filed Jul. 7, 2008, which claims priority to German Patent Application No. 10 2007 031 906.3, filed Jul. 9, 2007, both of which are hereby incorporated by reference.

FIELD OF THE INVENTION

The present invention relates to an apparatus and a process for filling structures with different cavities.

BACKGROUND

A process of this type is, for example, required in the manufacture of bricks in which moldings made of an insulant material are inserted into cavities. Thus, DE 10 2006 002 826 A1 discloses a process of the type in question in which the moldings are formed with a volume greater than the volume of the cavities, preferably with a width and/or length greater than those of the cavities, so that the moldings are held in the cavities with frictional engagement (claim 1). The manner in which these moldings enter the cavities in an industrial production may not be inferred from said document.

The previously published DE 100 58 463 A1 discloses a brick which is distinguished in that the cavities of the brick are filled partly or completely with mineral wool.

DE 102 17 548 A1 also disclosed an apparatus and a machine which are distinguished in that the apparatus and the machine are used to introduce mineral wool into the cavities of extruded perforated bricks. Specifically, said document also claims that the apparatus and the machine cut off mineral wool cushions and mineral wool goods sold by the meter, press them together between two metal sheet-like bodies, insert them, while pressed together, into the cavities of extruded perforated bricks, and that the two metal sheet-like bodies are successively removed from the cavity, so that the mineral wool cushion is left behind in the cavity and sits there in a non-slip manner as a result of its internal stress.

However, both documents describe only the effect based on planned measures; they do not, however, contain specific exemplary embodiments for in-series filling of perforated bricks. DE 10 2006 034 073 A1 describes a further process for manufacturing a molded brick, in which at least some of the channels are filled out with pourable and/or blowable insulant particles made of mineral fibers with or without binder (claim 1). The corresponding apparatus for carrying out this process consists substantially in the fact that the insulin particles are blown in with the aid of baffle plates.

Furthermore, DE 10 2006 022 516 A1 proposes a process for manufacturing a molded brick with an at least partial filling made of an insulant material which has at least limited compressibility, in which the filling is in the form of moldings at least for some of the channels and the moldings are drawn into the channels (claim 1). As the apparatus for carrying out this process, it is substantially claimed that a gripping apparatus for receiving at least one molding is movable parallel to the channel in the molded brick relative to the bearing surface, the gripping apparatus having a push-out apparatus, which is movable relative to the longitudinal axis of the receptacle, for the molding (claim 90). This gives an idea as to how a molding can be brought into the channel of a molded brick and it is also stated that the gripping apparatus has two thin sheet metal elements which are connected to each other via a spring and the molding is moved in the direction of the surface normal of the bearing surface of the molded brick (claim 94) via hydraulically or pneumatically actuated pistons of a push-out apparatus and via reduced pressure (claim 109). However, DE 10 2006 022 516 A1 does not indicate how such a procedure of pushing out moldings is to proceed in the case of in-series filling of building blocks. Above all, the problem of moldings of different size, as is required in practice in the filling of molded blocks, is not addressed.

It is therefore the object of the present invention to provide an apparatus and a process for rapidly and reliably filling structures with different cavities, in particular building blocks, which can be used in an ongoing production procedure.

This object is achieved by an apparatus according to claim 1 and a process according to claim 15 respectively.

BRIEF DESCRIPTION OF THE DRAWINGS

The apparatus according to the invention will be described hereinafter in greater detail. In the individual drawings.

DETAILED DESCRIPTION

Figure 1:
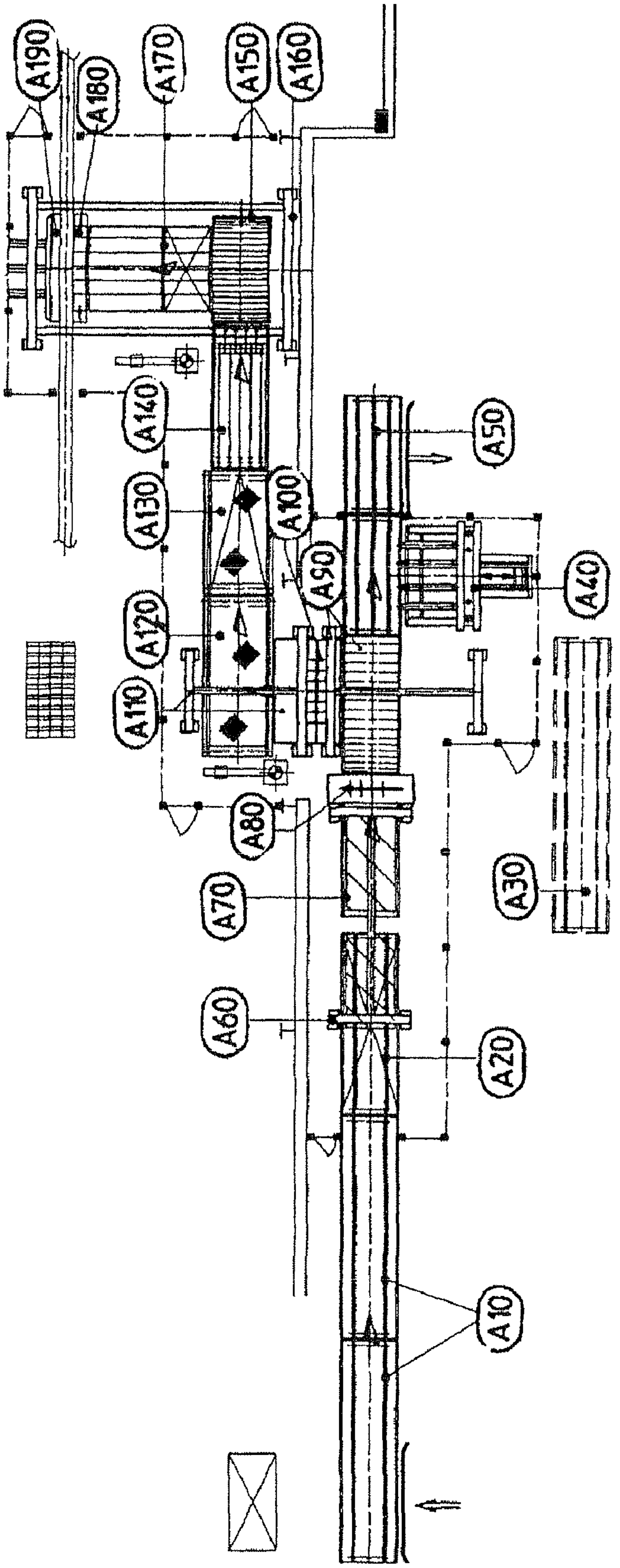
FIG. 1 is an overview of the apparatus according to the invention.

FIG. 1 is an overview of the apparatus according to the invention as a whole. This shows the individual system parts from (A 10) to (A 190) in interaction with the entire procedure of the industrial filling of building blocks. The ordering according to the invention of mineral wool pads, the classifying, which is necessary for the filling, and the filling of the corresponding building blocks are carried out in system parts (A 120) to (A 190).

In (A 20) the longitudinal transportation of the mineral wool mats in stack form is brought about via a chain conveyor with a lifting platform. The chain conveyor is constructed on a hydraulic lifting platform, the lifting platform traveling upward in cycles, in each case by the thickness of a board, and traveling downward after the products have been removed. The empty wooden pallets, on which the mineral wool stacks are advanced, are carried off via the chain conveyor (A 30).

The pallet stacking device (A 40) is used to stack the wooden pallets. The stacks of pallets are supplied by the chain conveyor (A 50) to the removal station. The gantry charging device (A 60) is equipped with pneumatically actuated needle grippers and takes single mineral mats from a stack for deposition on a sheet metal table (A 70) from which the mineral mats are sent and cut into strips by way of a longitudinal saw (A 80). In the roller conveyor and gantry push-off device (A 90), the cut strips are split up in the transverse direction by way of the transverse saw (A 100) into small or large pieces respectively. The quantitative result of the sawing procedure is detected by sensors; the quality of the individual mineral wool pads is also automatically assessed via optical sensors and leads, in the event of a negative result, to the discarding of individual pieces or even of whole layers or rows. Data, which are important for the central controlling of the overall system, concerning the number and the type of the delivered formats of the mineral wool pads cut in the saws are transmitted from the saws directly to the central controller.

After the sawing, the cut mineral wool pads (1, 2) are transversely pushed off in layers by way of the gantry push-off device (A 110) onto the subsequent band conveyor (A 120) via a sheet metal table.

Figure 2:
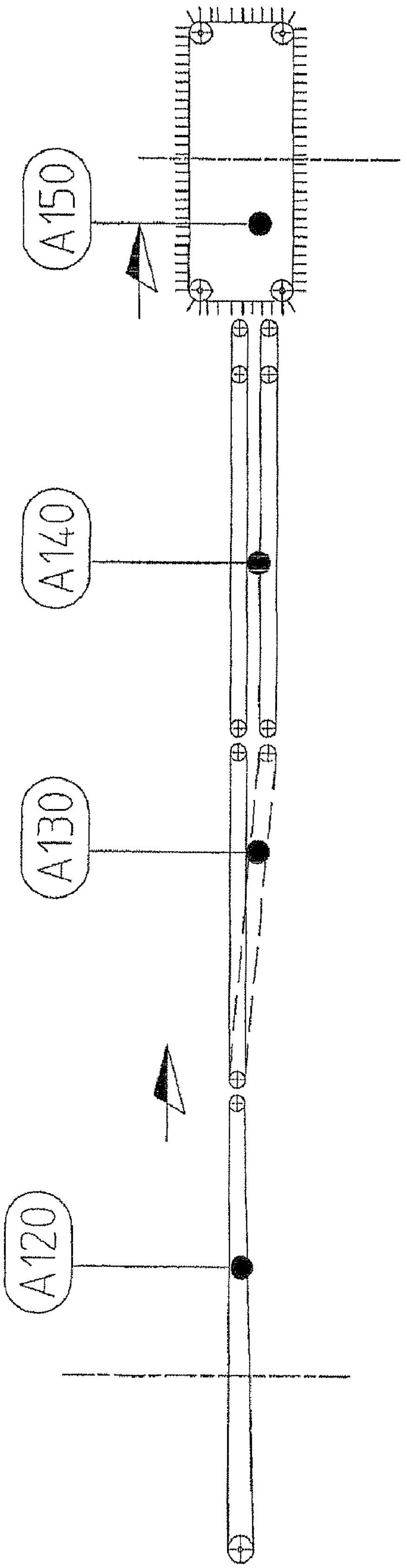
FIG. 2 is a detailed overview of system parts (A 120) to (A 150)

FIG. 2 illustrates the interacting of system parts (A 120) to (A 150). The band conveyor (A 120) is used for onward transportation of a layer of mineral wool pads. From there, a layer of this type arrives at the toothed belt conveyor (A 130) which is designed so as to be tiltable on one side, so that the layers can be distributed onto two levels in alternation. The tilting is carried out pneumatically.

The mineral wool pads are transported onward in the two toothed belt conveyors (A 140) shown which act as the separating and transport unit. A layer of mineral wool pads is separated and fed to the loop conveyor (A 150) by way of respectively prefabricated means for targeted restraint (for example a short conveyor). Band conveyors can also be used instead of toothed belt conveyors.

Figure 3:
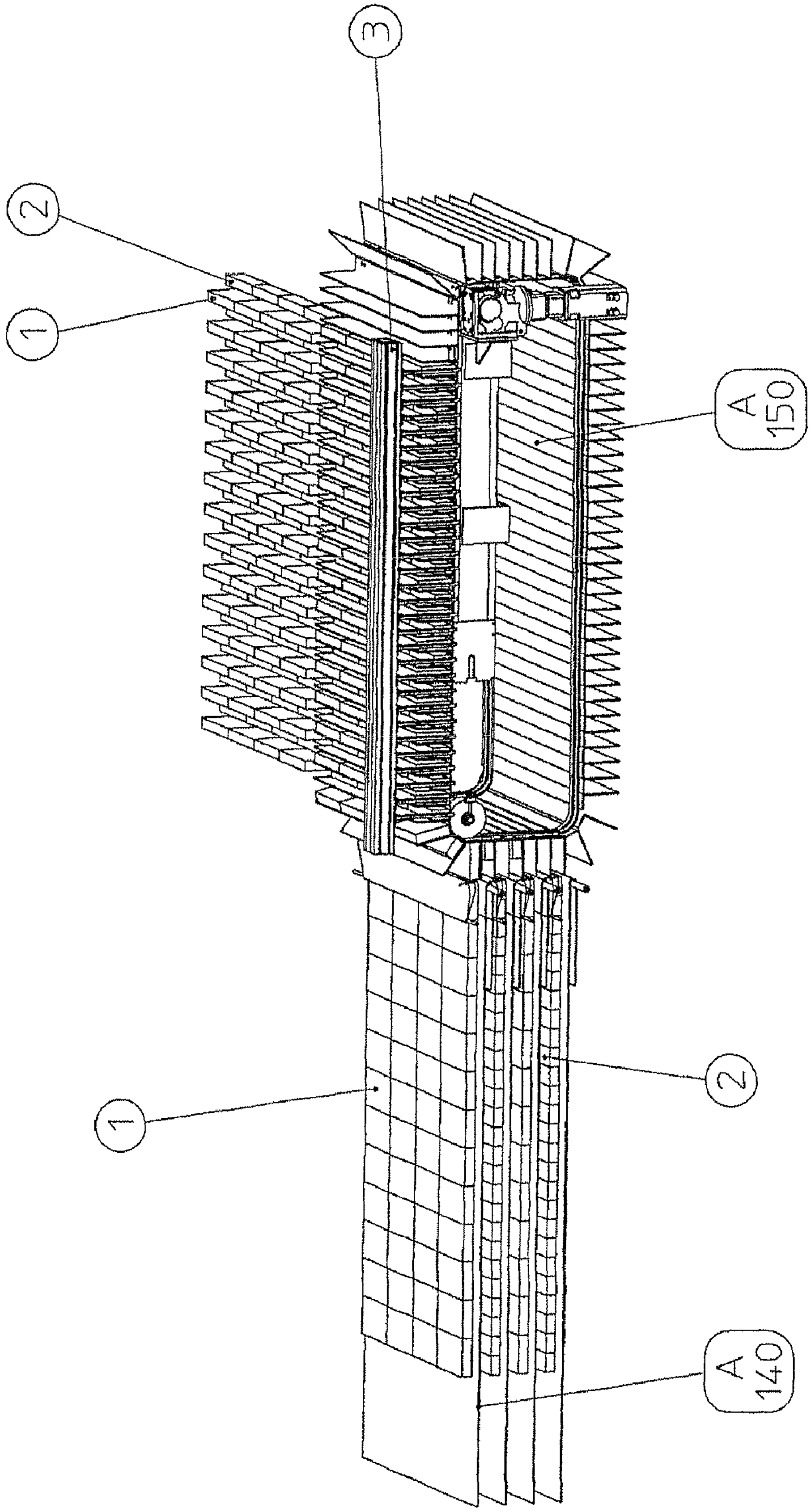
FIG. 3 is a perspective detailed drawing of system parts (A 140) and (A 150)

FIG. 3 is a perspective view of the interacting of the separating and transport unit (A 140) and the loop conveyor (A 150).

System part (A 140) consists in this case of four parallel-running conveyors, wherein in this case, by way of example, the top conveyor is fitted in each case with large mineral wool pads (1) and the bottom conveyor is fitted with respectively small mineral wool pads (2). This example clearly shows that the apparatus according to the invention or the overall system can in each case be made very flexible, depending on the demands made. Thus, it does not limit the capacity and the possibilities for controlling the apparatus as a whole if, instead of two different sizes or types of mineral wool pads, three or four different types thereof have to be processed simultaneously. The filling speed can also be increased by increasing the cycle times and/or increasing the number of transport levels of the separating and transport unit (A 140).

The perspective illustration of FIG. 3 very clearly shows the receiving of rows of mineral wool pads and the onward transportation thereof in the perpendicular direction. Thus, the mineral wool pads lying on the conveyor (A 140) are grasped by the web-like grasping elements, revolving in the clockwise direction, of the loop conveyor (A 150) and slip during onward conveyance into a perpendicular position in which they remain until the building blocks are filled. When the loop conveyor (A 150) has received a number of suitable mineral wool pads that is sufficient for onward conveyance, the mineral wool pads are, as is shown, pushed by the displacement unit (3) horizontally from the treadmill. A layer of large mineral wool pads (1) and, next to it, another layer of small mineral wool pads (2) may, for example, be seen in the background of the right-hand region of FIG. 3. In the described procedures, sensors for detecting and monitoring the cyclic procedures and for controlling the machine drives involved are provided at all of the relevant points which, for the sake of clarity, are not indicated separately. The spectrum ranges in this case from optical sensors and motion detectors of any type up to timing devices and position indicators.

Figure 4:
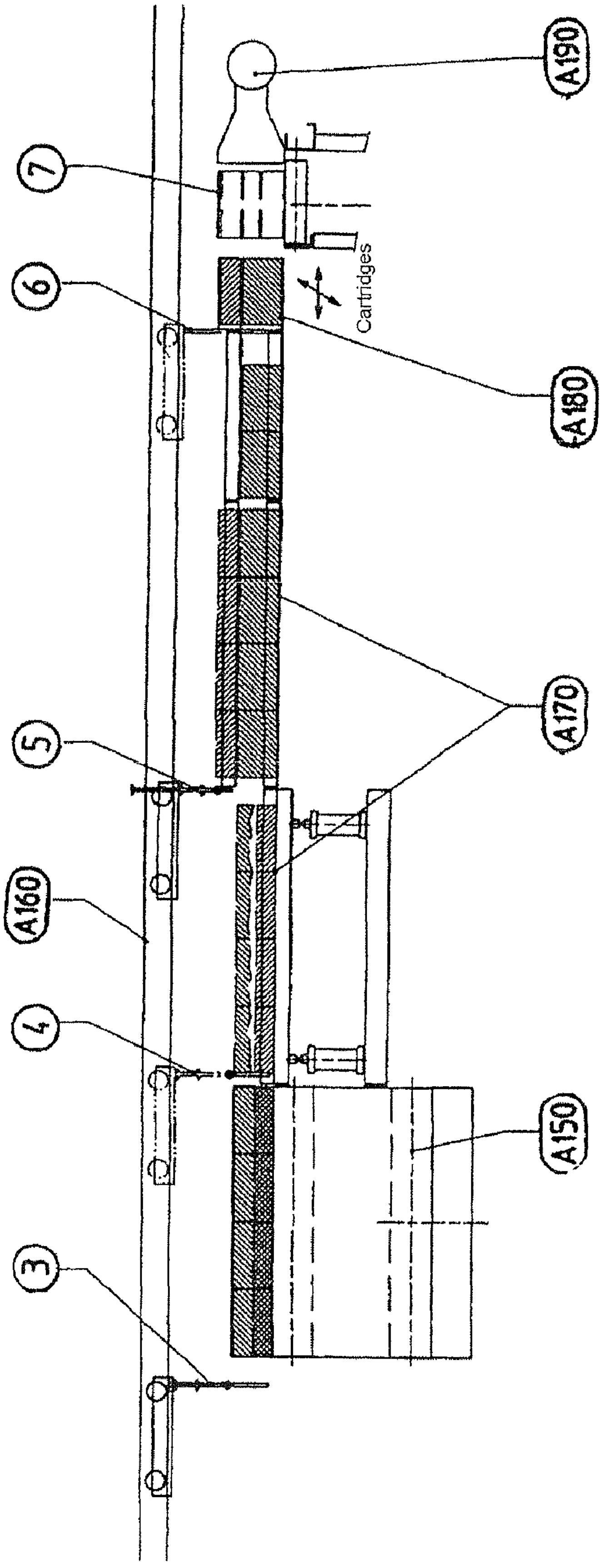
FIG. 4 is an illustration of system parts (A 150) to (A 190)

The overview, shown in section in FIG. 4, of the mode of operation of system parts (A 150) to (A 190) shows in the upper part a transverse rail in which various displacement elements (3, 4, 5), in the form of height-adjustable, pin-like structures, which are flexibly associated with the individual system parts, may be seen. This rail, which is shown in cross section, is a part of the gantry push-off device (A 160) which may also be seen in the right-hand upper part of FIG. 1.

It should be borne in mind in this case that the illustrated situation shows just one rail of many which are arranged substantially parallel, next to one another. As may also be seen from FIG. 1, the loop conveyor (A 150) is arranged transversely under the gantry push-off device (A 160). Therefore, the illustration begins, on the left-hand side of FIG. 4, with the displacement unit (3) which is associated with the loop conveyor (A 150) which is arranged in this illustration transversely to the plane of the drawing. In the region of the supply unit or the lifting means (A 170), cylindrical components are shown that illustrate that in this case the layers, which are pushed off transversely from the loop conveyor (A 150) described, of mineral wool pads (1, 2) can be vertically moved in a stroke-like manner, as illustrated in the longitudinal direction.

This allows the sequence controller acting in the apparatus to push off, depending on whether, for example, the large mineral wool pads (1) are to be introduced at the top or bottom in the building block in question, the mineral wool pads transversely from the loop conveyor (A 150), to push them onward to the desired point and to raise them or leave them there, as demanded in each case. The same applies to the small mineral wool pads (2). The mineral wool pads to be introduced can thus be rapidly displaced to each desired location both horizontally and vertically. As only two different types of mineral wool pads or two different levels are to be observed in the example described, only two lifting positions are likewise necessary. However, the apparatus according to the invention can be extended so as also to allow a plurality of lifting levels to be implemented. The displacement unit (4) is associated with the distribution unit (A 170) for the required displacements.

In the provision unit (A 180), the previously correctly distributed layers of mineral wool pads are pushed by the displacement unit (5) into corresponding sheet metal channels and each brought up to what is known as the “front block” which is marked “Kassetten” (“cartridges”) and is mounted upstream of the actual block (7) to be filled. This is brought about by the displacement unit (6).

The suction unit (A 180) can be brought up laterally to the building blocks. The suction unit as a whole consists of a sheet metal box, integrated into which are touch control valves which can individually close the vacuum. A touch control valve with a plate screwed onto the front is provided for each mineral wool pad drawn in by suction. The suction unit as a whole is exchangeable and is connected to a reduced-pressure fan.

Figure 5:
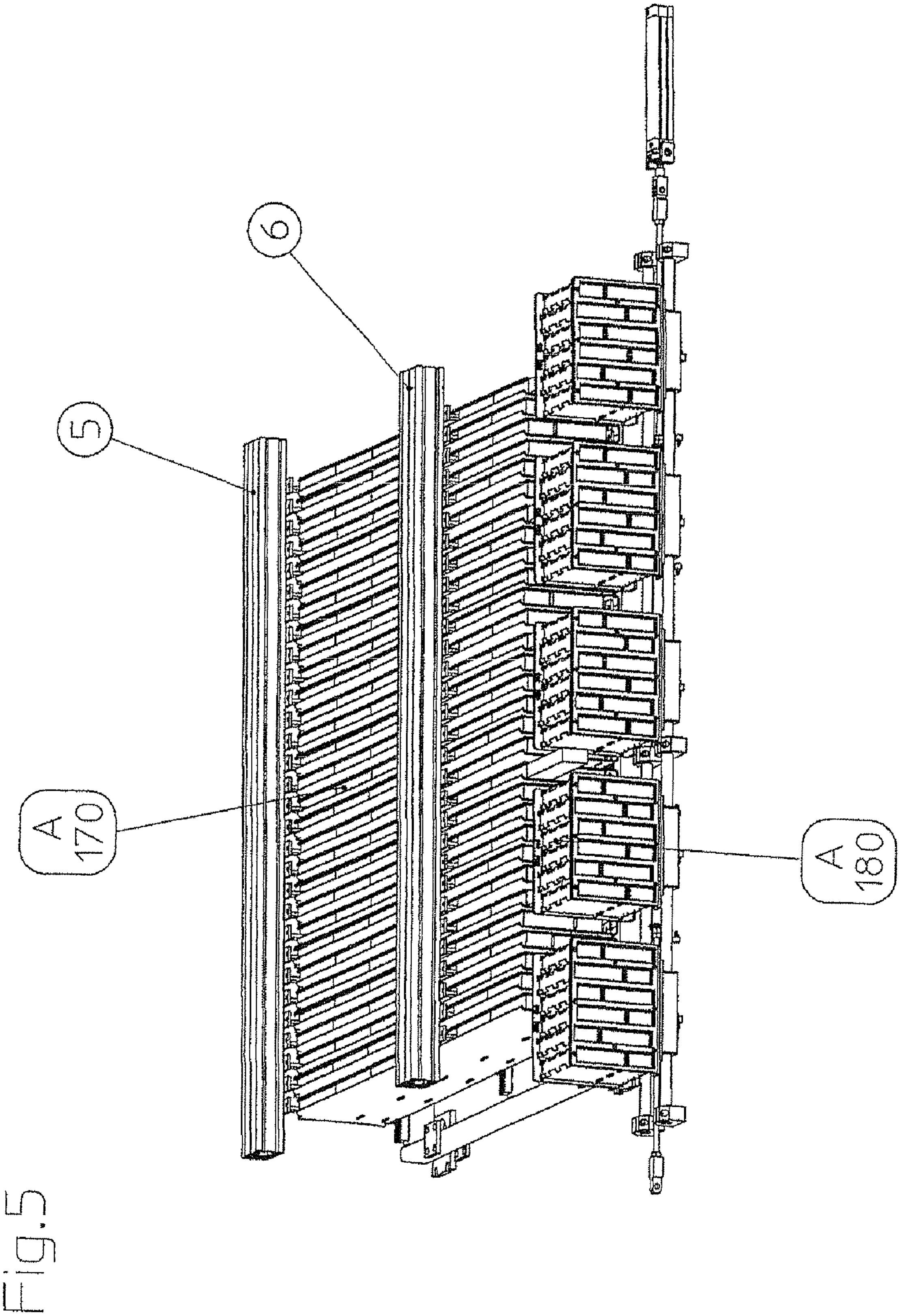
FIG. 5 is a perspective plan view onto system parts (A 170) and (A 180)

FIG. 5 is a further perspective view of system parts (A 170) and (A 190). The displacement unit (5) is again shown.

Figure 6:
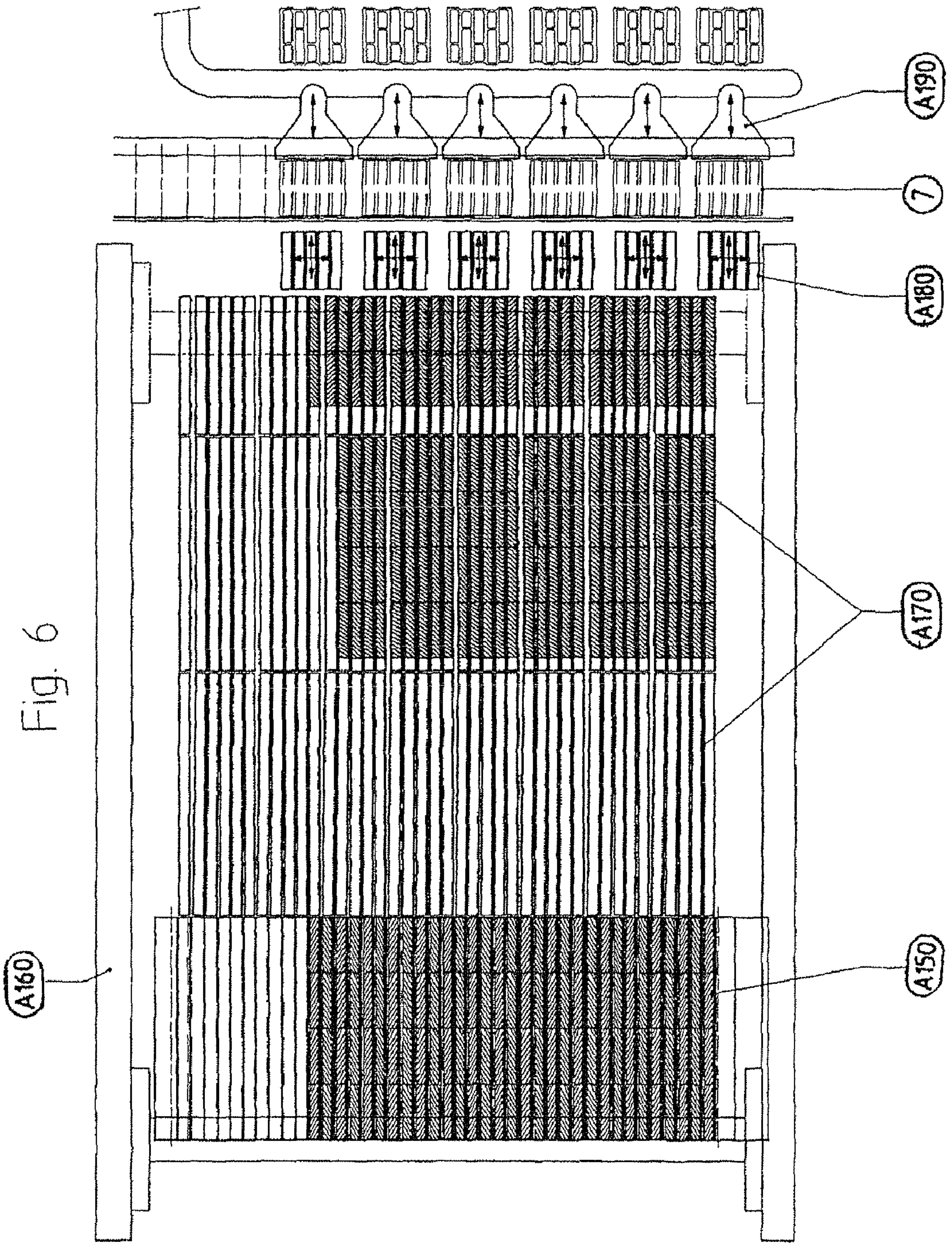
FIG. 6 is a plan view onto system parts (A 150) to (A 190).

FIG. 6 shows system parts (A 150) to (A 190) perpendicularly from above.

It goes without saying that the cavities of all of the building blocks that are advanced in a working cycle can be filled simultaneously.

| List of reference numerals | |
|---|---|
| A 20 | chain conveyor with lifting platform |
| A 30 | chain conveyor with empties |
| A 40 | pallet stacking device with chain conveyor |
| A 50 | chain conveyor |
| A 60 | gantry charging device with longitudinal sawing means |
| A 70 | depositing and orienting apparatus |

-continued

| List of reference numerals | |
|---|---|
| A 80 | longitudinal sawing means |
| A 90 | roller conveyor and gantry push-off device |
| A 100 | transverse saw |
| A 110 | gantry push-off device |
| A 120 | band conveyor |
| A 130 | toothed belt conveyor with tilting means |
| A 140 | separating and transport unit |
| A 150 | loop conveyor |
| A 160 | gantry push-off device of mineral wool pads |
| A 170 | distribution unit for mineral wool pads (lifting and guide means) |
| A 180 | provision unit for mineral wool pads |
| A 190 | suction unit |
| (1) | large mineral wool pad |
| (2) | small mineral wool pad |
| (3) | displacement unit (loop conveyor), A 150 |
| (4) | displacement unit, lifting floors, A 170 |
| (5) | distribution unit, sheet metal channel guide, A 180 |
| (6) | displacement unit for cartridges |
| (7) | brick |

The invention claimed is:

1. An apparatus for industrially filling differently structured cavities in building blocks with moldings cut from mineral wool mats, comprising the following system parts, these being listed in the order of the flow of material or filling procedure:

a) a longitudinal sawing means (A 80) in order to cut the mineral wool mats into strips, b) a roller conveyor and a first gantry push-off device (A 90) for onward transportation of the mineral wool strips, c) a transverse sawing means (A 100) for cutting the mineral wool strips into large mineral wool pads (1) or small mineral wool pads (2), d) a second gantry push-off device (A 110) for transversely pushing off large mineral wool pads (1) or small mineral wool pads (2), e) a band conveyor (A 120) for onward transportation of the respective mineral wool pads (1, 2), f) a toothed belt conveyor with a tilting apparatus (A 130) for distributing large mineral wool pads (1) or small mineral wool pads (2) onto a separating and transport unit (A 140), g) the separating and transport unit (A 140) for onward conveyance of alternating layers of large mineral wool pads (1) or small mineral wool pads (2) onto a loop conveyor (A 150), h) the loop conveyor (A 150) for generating rows of large mineral wool pads (1) and small mineral wool pads (2) in alternation, the rows being positioned transversely to the direction of travel of the separating and transport unit (A 140), i) a third gantry push-off device (A 160) of mineral wool pads for pushing off individual transversely positioned rows of mineral wool pads (1, 2) from the loop conveyor (A 150) into the region of a distribution unit (A 170), j) the distribution unit (A 170) for mineral wool pads with a lifting means and a guide means for arranging layers arranged one above another of mineral wool pads (1, 2) in sheet metal channels, k) a provision unit for mineral wool pads (A 180) for displacing the mineral wool pads (1, 2) in cartridges, l) a suction unit (A 190) for sucking the mineral wool pads (1, 2) into the building blocks lying ready.

2. The apparatus as claimed in claim 1, wherein the distribution unit (A 170) serves to distribute the mineral wool pads (1, 2) in at least two levels, lifting units being provided that are positioned next to one another and are each equipped with at least one pneumatic double stroke and sheet metal channels being provided in the onward guiding position, of which in each case at least two sheet metal channels are arranged one above another.

3. The apparatus as claimed in claim 2, wherein the provision unit (A 180) comprises a plurality of cartridges which are placed on a longitudinal traveling unit, each cartridges being equipped with a large number of sheet metal channels and the cartridges being brought transversely up to the bricks and the cartridges being exchanged in accordance with the type of brick to be fitted.

4. The apparatus as claimed in claim 3, wherein the suction unit (A 190) contains touch contact valves which can individually close a vacuum, the suction unit as a whole being exchangeable and being connected to a reduced-pressure housing.

5. The apparatus as claimed in claim 1, wherein mineral wool stacks from which the mineral wool pads (1, 2) are produced are provided via a first chain conveyor (A 20) and empty wooden pallets are carried off via a second chain conveyor (A 30).

6. The apparatus as claimed in claim 1, wherein a pallet stacking device (A 40) raises a pallet which has arrived and the next pallet moves therebelow, a third chain conveyor with 3 chain strands interacting with a fork lifting device and a drive being provided via a constant transmission brake motor.

7. The apparatus as claimed in claim 1, wherein a fourth chain conveyor (A 50) serves to transport a stack of pallets to an unloading station.

8. The apparatus as claimed in claim 1, wherein a gantry charging device (A 60), in which a carriage is moved that is equipped with pneumatically equipped needle grippers, is used for removing individual mineral fiber boards from the stack, for depositing on a sheet metal table (A 70) and for splitting up the individual mineral fiber boards in the longitudinal direction by way of the longitudinal saw means (A 80).

9. The apparatus as claimed in claim 1, wherein the longitudinal transportation of the cut strips and the transportation by way of the transverse saw means (A 100) are carried out via the roller conveyor and gantry push-off device (A 90) and also the transverse pushing of the cut mineral wool pads (1, 2) is carried out via the second gantry push-off device (A 110).

10. The apparatus as claimed in claim 1, wherein drive is provided, unless otherwise stated, via frequency-controlled three-phase current motors.

11. The apparatus as claimed in one claim 1, wherein sensors individually detect and monitor the system parts in order to implement control procedures of the apparatus.

12. The apparatus as claimed in claim 1, wherein means are used for detecting operational faults in the apparatus and further means are present for eliminating these faults.

13. The apparatus as claimed in claim 12, wherein the means for detecting operational faults are optical sensors and faults are eliminated via electronically controlled grippers for grasping defective individual mineral wool pads (1, 2) and/or by eliminating mineral wool pads arranged in layers from the overall region of the system.

14. The apparatus as claimed in claim 1, wherein all relevant dimensions and settings can be set on building blocks having different formats and dimensions.

15. The apparatus as claimed in claim 1, wherein said longitudinal sawing means and said transverse sawing means cut the mineral wool mats into large mineral wool pads and small mineral wool pads.

16. The apparatus as claimed in claim 15, wherein in step d) said second gantry push-off device (A 110) transversely pushes off said large mineral wool pads and said small mineral wool pads (2); and in step g) the separating and transport unit (A 140) comprises an upper conveyor for transporting one of the large and small mineral wool pads, and a lower conveyor for transporting the other of the large and small mineral wool pads onto a loop conveyor (A 150).

* * * * *